United States Patent [19]

Mizobata et al.

[11] 3,774,379
[45] Nov. 27, 1973

[54] LAWN MOWER

[75] Inventors: Shiro Mizobata; Yoshiro Kawano; Masamiki Matsumoto, all of Hikone, Japan

[73] Assignee: Matsushita Electric Works, Ltd., Osaka, Japan

[22] Filed: Sept. 20, 1972

[21] Appl. No.: 290,481

[30] Foreign Application Priority Data
Sept. 30, 1971 Japan................. 46/90357

[52] U.S. Cl..................... 56/10.3, 56/16.9, 56/17.5
[51] Int. Cl................................. A01g 3/06
[58] Field of Search.............. 56/16.9, 17.5, 10.3, 56/255

[56] References Cited
UNITED STATES PATENTS

| | | | |
|---|---|---|---|
| 3,017,733 | 1/1962 | Evans | 56/17.5 |
| 2,648,187 | 8/1953 | Ries | 56/16.9 |
| 2,862,376 | 12/1958 | Thelander | 56/17.5 X |
| 3,587,749 | 6/1971 | Sauer | 56/17.5 X |
| 3,034,275 | 5/1962 | Happe et al. | 56/17.5 X |

*Primary Examiner*—Louis G. Mancene
*Assistant Examiner*—J. N. Eskovitz
*Attorney*—Wolfe et al.

[57] ABSTRACT

A lawn mower comprises a motor-driven lawn mower body having a holding part for user's manual handling and a caster body having two branched arms to which the holding part of mower body is detachably coupled so as to allow the user to handle the lawn mower readily in either way of using the mower body alone separately or with the caster body. Fixed blade in the mower body is secured to a fixing plate of a plastics fixed to the mower body containing the motor and movable blade has a resilient clutch means for breaking connection with drive power transmitting means upon application of reverse directional load to the movable blade.

3 Claims, 10 Drawing Figures

Patented Nov. 27, 1973

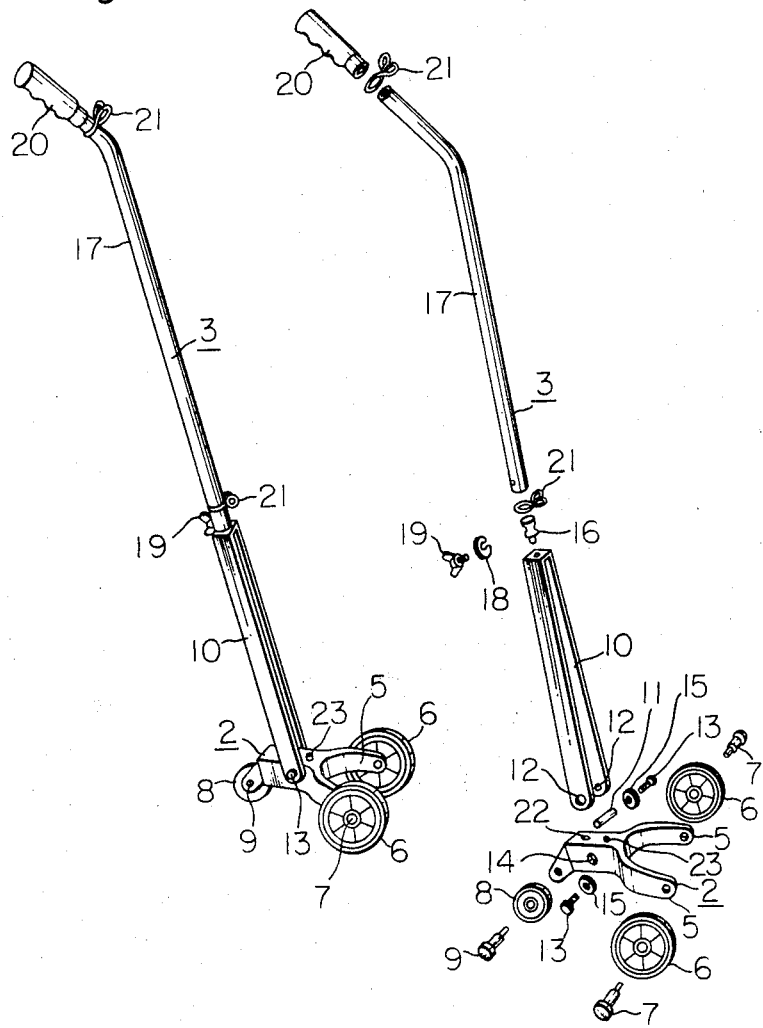

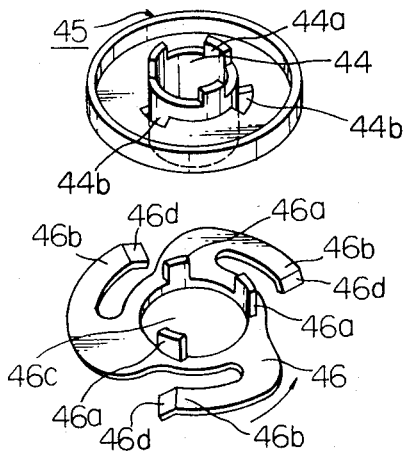
Fig. 9A
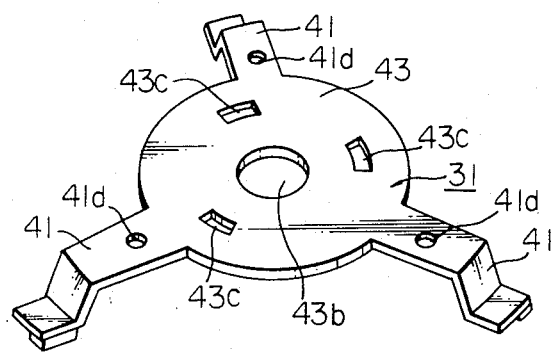
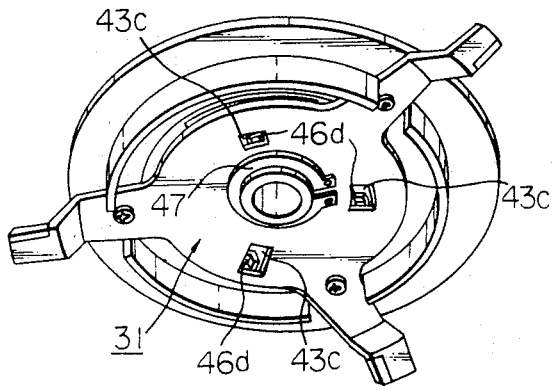
Fig. 9B

LAWN MOWER

This invention relates to improvements in lawn mowers.

There have been already suggested motor-driven lawn mowers provided with a caster. However, in these known mowers, it is not considered to use only the lawn mower body by removing the caster and thus it is not easy to fit or remove the lawn mower body to or from the caster. Further, in the case of using only the lawn mower without the caster, it has not been easy to hold the lawn mower body. Futher in known mowers, as there is provided no clutch mechanism between the blade body and driving part, in case any foreign matter above the cutting capacity of the mowers is introduced into the blade part, the blade part will be likely to be broken. Further, there has been made no contrivance to reduce the metallic sound of a high frequency produced from the blade body part to be of a frequency which is not unpleasant to the human. The present invention has been suggested to improve the above mentioned defects.

A main object of the present invention is, therefore, to provide a motor-driven lawn mower which is removably coupled to a caster so as to be easy to handle.

Another object of the present invention is to provide a lawn mower provided with a clutch mechanism and high in the safety.

A further object of the present invention is to provide a lawn mower having a fixing plate made of a plastics material which is effective in reducing the natural frequency and having a sound absorbing action.

The present invention shall be explained in detail in the following with reference to accompanying drawings, in which:

FIG. 3 is a perspective view of the caster in FIG. 1 as removed from the mower body.

FIG. 4 is a similar perspective view of the caster but with all components thereof disassembled.

FIGS. 9A and 9B show in perspective views movable blade and its associated clutch mechanism shown in FIG. 6 respectively woth all components disassembled and assembled together.

Figure 1:
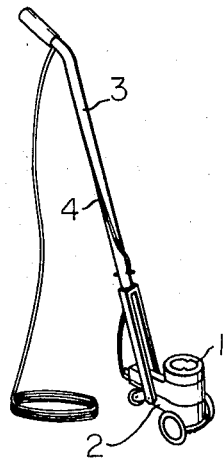
FIG. 1 is a perspective view of the lawn mower of the present invention.

Referring first to FIG. 1 which showing the entire lawn mower of the present invention, 1 is an electric lawn mower body, 2 is a caster body, 3 is a handle and 4 is an electric source cord.

Figure 2:
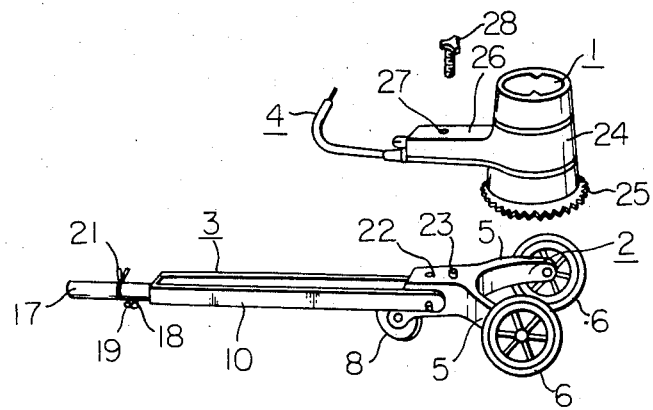
FIG. 2 is a perspective view of the lawn mower of FIG. 1 with the caster removed and partly cut off.
Figure 5:
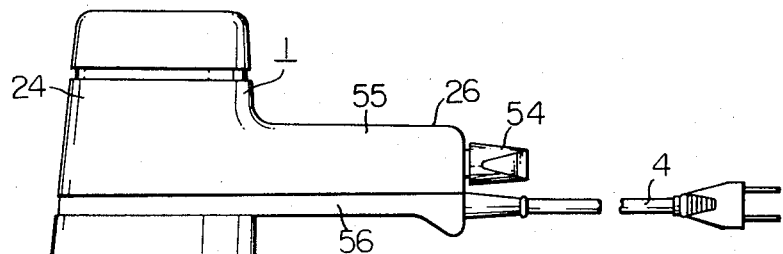
FIG. 5 is a side view of the motor-driven lawn mower in FIG. 1.

Refferring to FIGS. 2, 3 and 4 in conjunction with FIG. 1, the caster body 2 comprises two forked arms 5, wheels 6 rotatably borne with pins 7 from outside at the free ends of said arms 5, a small wheel 8 rotatably borne with a pin 9 at the rear end of the caster body 2, Said caster body 2 is held on both sides with a forked frame 10 forming the handle 3 and said handle 3 is vertically rotatably borne on the caster body 2 by screwing bolts 13 passed through holes 12 made at the lower ends of the frame 10, through a spindle 11 disposed within the caster body 2 and through holes 14 made on the side walls of the caster body 2. 15 is a washer to be used together with said bolt 13. In the handle 3, a coupling rod 16 is calked and fixed to project at the upper end of the frame 10 and a pipe 17 is fitted at the lower end thereof to said coupling rod 16 and fixed thereto with a spring washer 18 and thumbscrew 19. A grip 20 is fitted to the other upper end of the pipe 17. Hangers 21 formed of a wire for the source cord 4 are fitted to the upper and lower ends of said pipe 17. The electric source cord 4 is engaged to said hangers 21 so as to be prevented from being trodden or being hurt with the blade of the lawn mower.

A through hole 22 and projection 23 are made on the upper surface of the caster body 2.

In the lawn mower body 1, a driving blade 25 is provided below a cylindrical body 24 of the body 1 and a holding part 26 is projected on the peripheral part of said cylindrical body 24 so that, when said lawn mower body 1 is to be used as directly held by user's hand, the user may hold said holding part 26 and, when it is to be used together with the caster body 2 having the handle 3, the holding part 26 of the lawn mower body 1 may be set on the upper surface of the caster body 2 so as to interpose the driving blade 25 and cylindrical body 24 between the arms 5. In this case a bolt 28 will be passed through a through hole 27 made in the holding part 26 and screwed into the through hole 22 made in the caster body 2 and, at the same time, the projection 23 provided on said caster body 2 will be engaged with a recess (not illustrated) provided on the back surface of the holding part 26. As the lawn mower body 1 is fixed to the caster body 2 in such manner, the lawn may be mowed while moving the caster body 2 by holding the handle 3.

As shown in FIGS. 5 through 8, the driving blade 25 comprises a fixed blade 29, a fixing plate 30 made of a synthetic resin to fix the fixed blade 29 and a movable blade 31. The fixed blade 29 has saw blades 32 in the peripheral edge part, a hole 33 in the center and three fixing holes 34 at regular intervals in the intermediate part between the edge part and the center hole. The fixing plate 30 has six projections 35 provided to project on the lower surface of the fixing plate 30 and has three concave parts 36 and three screw holes 37 alternately on the other upper surface at positions corresponding to said projections 35. A boss 39 made of a metal and having a through hole 38 is provided to project in the central part of said upper surface and the fixed blade 29 is fixed to the fixing plate 30 as mounted on the upper surface of the fixing plate 30 so that the hole 33 in the center of the fixed blade 29 will fit said boss 39 and secured to the position by means of bolts 40 passed through respective fixing holes 34 in said fixed blade 29 into respective screw holes 37 in the fixing plate 30.

The movable blade 31 is provided with a clutch mechanism for the purpose of protecting the respective fixed and movable blades as well as the driving motor from being damaged due to any obstacles which are hard or unable to cut, as shown and detailed with reference to FIGS. 9A and 9B. That is, referring first to FIG. 9A, the movable blade 31 comprises a disk-shaped base 43 having a hole 43b made in the center, three apertures 43c provided along a concentric circle with respect to the center of the disk, and three cutting arms 41 projected radially at regular intervals out of this disk-shaped base 43. The disk-shaped base 43 is connected with a connecting member 45 through a clutch spring 46. Said connecting member 45 has its boss part 44 to be passed at its lower end through the hole 46c in the clutch spring 46 and through the hole 43b in the movable blade 31, so that member 45 will be combined with the movable blade 31 in rotatable manner. A stopper 47 will be fitted around the lower end of the boss 41 behind the blade 31 so as to prevent the member 45 from being pulled out (FIG. 9B). In the connecting member 45, which is prepared to transmit a torque to the movable blade, a gear 44a to be coupled to a rotary shaft connected with the driving source is formed at the top end of the central boss part 44 and a plurality of holes 44b is provided adjacent and around the boss 44 for coupling the clutch spring 46 to the member 45. That is, the clutch spring 46 is provided with three raised pieces 46a around the hole 46c so as to be fitted into the holes 44b in the connecting member 45. The member 45 further has three arm-shaped spring parts 46b corresponding at the tips respectively to the three apertures 43c in the above mentioned disk-shaped base 43. An inclined pawl part 46d is provided at the free end tip of each arm-shaped spring part 46b, so that, at the time of the normal operation of the mower, the disk-shaped base 43 having the integral cutting arms 41 as movable blade will be rotated by receiving a torque through the clutch spring 46 and connecting member 45 but, at such abnormal time as the case that a stone or the like is held between the fixed blade and movable blade, the pawl parts 46d of the arm-shaped spring parts 46b of the clutch spring 46 nesting in the apertures 43c in the disk-shaped base 43 will slip off the windows 43c due to their resiliency to break the coupling between the member 45 and the base 43 so that movable blade will stop and thus the overload on the blade body will not be applied directly to the driving source.

Figure 6:
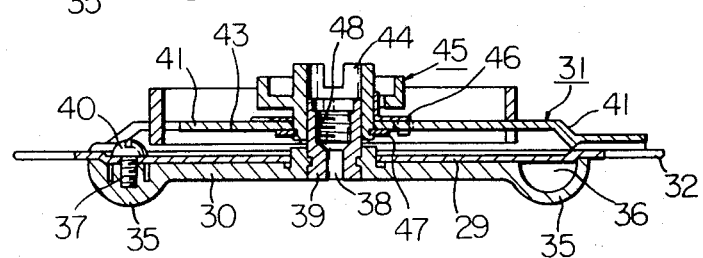
FIG. 6 is a vertical sectioned view of blade part in the mower of the present invention.
Figure 7:
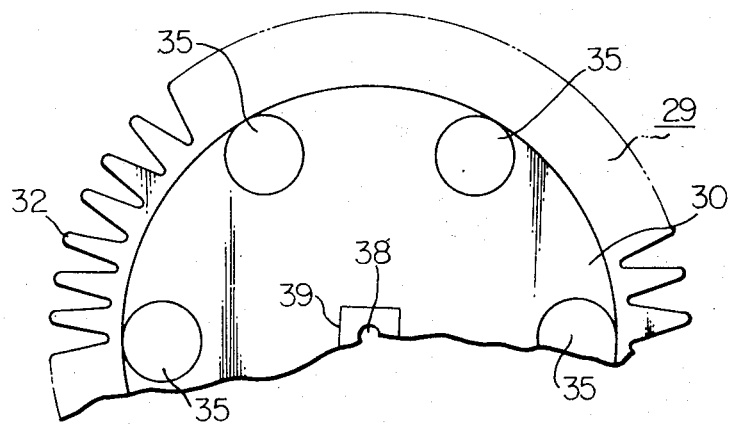
FIG. 7 is a partial bottom view of the blade part.
Figure 8:
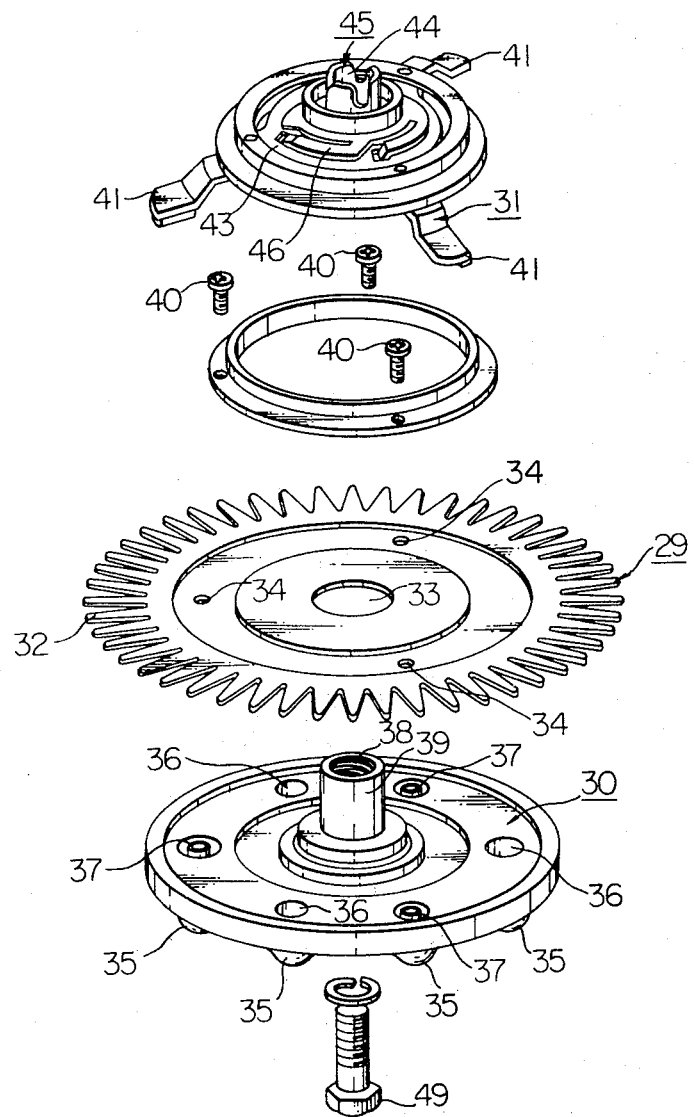
FIG. 8 is a perspective view of the blade part of FIG. 6 with the all components disassembled.

Said movable blade 31 is mounted on the fixed blade 29 in such manner that the 44 of the connecting member 44 will be rotatably fitted over the boss 39 of the fixing plate 30 (FIG. 6). The thus formed driving blade 25 is fixed to the lower part of the cylindrical body 24 of the mower body 1 by screwing the screw threads 48 in the through hole 38 in the fixing plate 30 onto a fixing shaft (not illustrated) contained in the cylindrical body 24 and further screwing a fixing bolt 49 shown in FIG. 8 into said fixing shaft through said through hole 38 in the fixing plate. In such case, the lower end of a tubular driving shaft (not illustrated) fitted to the outer periphery of said fixing shaft and the gear part 44a of the boss part 44 of the movable blade 31 will engage with each other and the cutting arm blades 41 of the movable blade 31 will be rotated by said driving shaft while being pressed in contact with the saw blades 32 so that the lawn will be mowed with said cutting arm blades 41 and saw blades 32.

According to the present invention, as described above, the lawn mower body 1 is removably fitted to the caster body 2 having the wheels 6 and 8 only through the holding part 26 which will be a handle part in case the electric lawn mower body 1 alone is used separately from the caster. Therefore, in the case of using only the lawn mower body 1 by hand, it will be simply separated from the other parts.

Further, in the present invention, as the clutch spring 46 is interposed between the movable blade 31 and the driving source as described above, in case a foreign matter so difficult to cut comes in between the fixed blade and movable blade, the movable blade will be idled so that the blade part will be prevented from being broken and the driving source will be protected from being overloaded.

Further, in the present invention, as the movable blade 31 is closely attached to the fixing plate 30 made of a plastic material large enough so that the natural frequency of the movable blade 31 will be substantially reduced as described above, unpleasant high frequency noises can be effectively reduced.

What we claim is:

1. An electric power mower suitable for both hand-held and caster-mounted operation, comprising:
    A. a caster assembly, including
        1. a base,
        2. a pair of forked arms branching outwardly of said base,
        3. three supporting wheels carried respectively by said base and by each of said arms,
        4. an elongated handle pivotably connected to said base, and
        5. first mounting means carried by said base, and
    B. a detachable mower assembly including
        1. a generally cylindrical lawn mower body positionable between said forked arms, said body including a fixed blade carried by said body, an electric motor rotable longitudinally of said body, and a rotatable blade coupled to said motor,
        2. a short handle extending radially from said body, and
        3. second mounting means carried by said short handle, said second mounting means being detachably coupleable to said first mounting means to thereby couple said detachable mower assembly onto said caster assembly.

2. A lawn mower according to claim 1 wherein said fixed blade is in close contact with a mounting plate made of a plastic, said mounting plate being secured to a stationary shaft positioned vertically within the lawn mower body, and spring means for urging said rotary blade onto the upper surface of the fixed blade.

3. A lawn mower according to claim 1 wherein said movable blade and said motor are connected with each other through a clutch means which is capable of disengagement upon application of reverse directional load to the rotary blade.

* * * * *